(12) United States Patent
Doerry

(10) Patent No.: US 6,608,586 B1
(45) Date of Patent: Aug. 19, 2003

(54) METHOD FOR REMOVING RFI FROM SAR IMAGES

(75) Inventor: Armin W. Doerry, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/205,658

(22) Filed: Jul. 25, 2002

(51) Int. Cl.⁷ .............................................. G01S 13/90
(52) U.S. Cl. ........................ 342/25; 342/89; 342/159; 342/194; 342/195; 342/196
(58) Field of Search ................. 342/25, 175, 176–186, 342/189–197, 159–174, 89–103

(56) References Cited

U.S. PATENT DOCUMENTS

| | | | |
|---|---|---|---|
| 4,771,287 A | * 9/1988 | Mims ........................... | 342/25 |
| 4,783,753 A | * 11/1988 | Crimmins ..................... | 342/25 |
| 5,349,359 A | 9/1994 | Dallaire et al. ............. | 342/195 |
| 5,488,374 A | * 1/1996 | Frankot et al. ................ | 342/25 |
| 5,546,085 A | 8/1996 | Garnaat et al. ................ | 342/25 |
| 5,686,922 A | 11/1997 | Stankwitz et al. ........... | 342/196 |
| 5,850,202 A | 12/1998 | Goodman et al. ............. | 342/25 |
| 5,861,835 A | * 1/1999 | Hellsten ....................... | 342/25 |
| 6,023,235 A | * 2/2000 | Sauer .......................... | 342/25 |
| 6,072,420 A | * 6/2000 | Hellsten ....................... | 342/25 |
| 6,166,678 A | 12/2000 | Jao .............................. | 342/25 |

OTHER PUBLICATIONS

"Nonlinear Apodization for Sidelobe Control in SAR"; IEEE Transactions on Aerospace and Electronic Systems vol. 31, No. 1 Jan. 1995.

"A High–Resolution, Four–Band SAR Testbed with Real–Time Image Formation", Walker, Sander, Thompson, Burns, Fellerhoff, & Dubbert; SAND96–0661C.

"Algorithms for Synthetic Aperture Radar Imagery VI", Zelnio; vol. 3721; Apr. 5–9, 1999; Orlando, Florida.

"Radio Frequency Interference Removal in a VHF/UHF deramp SAR", Golden, Weness, Stuff DeGranf & Sullivan; 84/SPIE Vo. 2487.

"Interference Suppression in UHF Synthetic–Aperture Radar" Ferrell; 96/SPIE vol. 2487.

"RFI Suppression for Ultra Wideband Radar"; Miller; IEEE Transactions on Aerospace and Electronic Systems; vol. 33. No. 4 Oct. 1997.

"Approaches By RF Interference Suppression for VHF/UHG Synthetic Aperture Radar"; Lord and Inggs; 07803–5054–5.0095 1998 IEEE.

"Sparse Aperture Fill for SAR Using Super–SVA"; Stankwitz & Kosek; 0–7803–3145–1/96/;1996 IEEE.

"SAR sidelobe apodization using parametric windows"; Thomas, Son & Flores; Part of the SPIE Conference on Algorthms for Synthetic Aperture Radar Imagery VI; Orlando, Florida; Apr. 1999.

* cited by examiner

Primary Examiner—Bernarr E. Gregory
(74) Attorney, Agent, or Firm—George H. Libman

(57) ABSTRACT

A method of removing RFI from a SAR by comparing two SAR images on a pixel by pixel basis and selecting the pixel with the lower magnitude to form a composite image. One SAR image is the conventional image produced by the SAR. The other image is created from phase-history data which has been filtered to have the frequency bands containing the RFI removed.

11 Claims, 5 Drawing Sheets

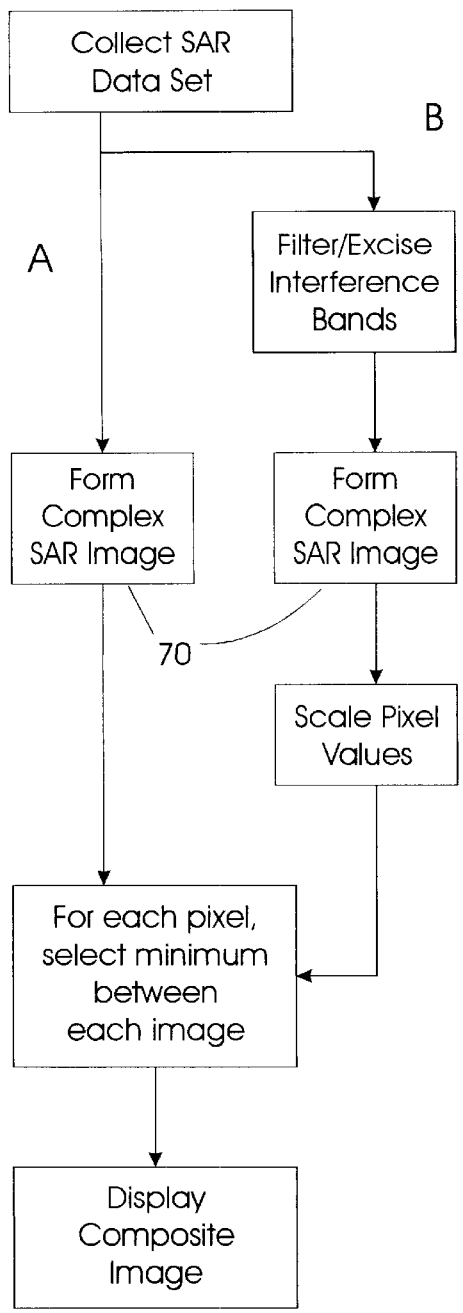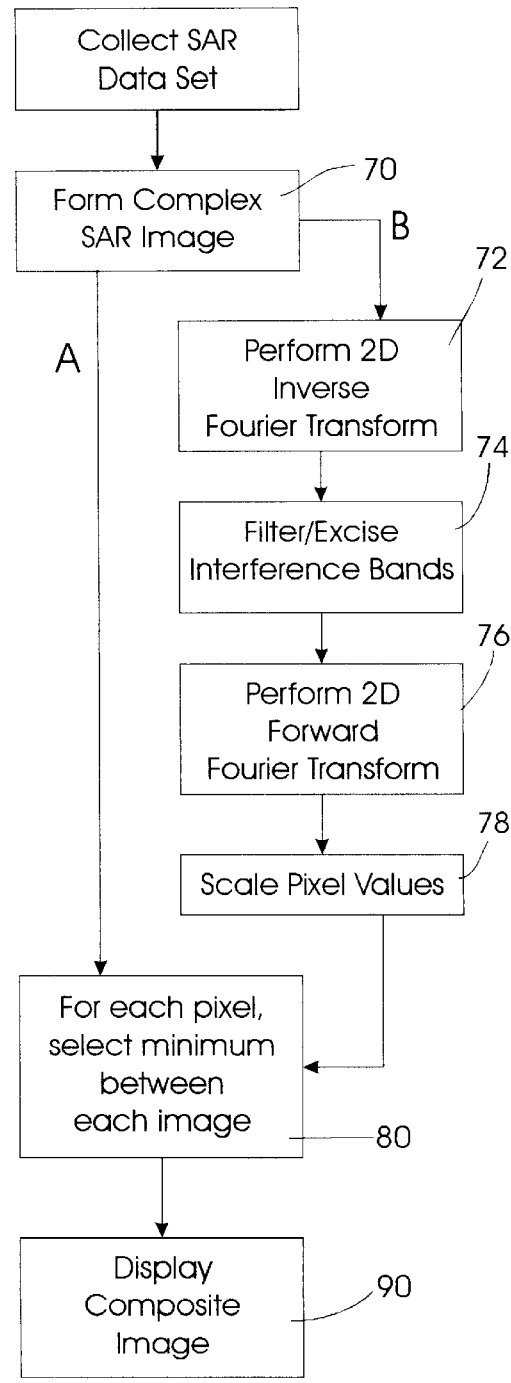
Fig. 3                                          Fig. 4

Vertical Slice of RFI Corrupted Image of Fig. 2b

Slice of RFI Filtered Image

Slice of Combined Image of Fig. 7

METHOD FOR REMOVING RFI FROM SAR IMAGES

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

In a typical synthetic aperture radar (SAR), a series of coherent linear-FM chirped pulses is transmitted and received from a moving vehicle such as an aircraft or satellite. The received pulses are digitized and processed to form raw data that is Fourier Transformed to yield a complex image that is detected and displayed.

Radio frequency interference (RFI), which is a common name for electromagnetic interference (EMI), is any electromagnetic disturbance that interrupts, obstructs, or otherwise degrades or limits the effective performance of electronics/electrical equipment. It can be induced intentionally, as in some forms of electronic warfare, or unintentionally, as a result of spurious emissions and responses, intermodulation products, and the like.

SAR has progressed from its first demonstration in the early 1950's to a precision instrument capable of generating 2 or 3-D radar images having a resolution in each direction of less than one foot. This high resolution requires a wide bandwidth signal, and a wide bandwidth means the SAR often receives RFI signals of a wide variety of frequencies and intensities. RFI is generated by garage door openers, cordless phones, two-way radios, pagers, wireless services, sensors, and many other sources. RFI routinely is detected by SAR as noise that masks the intended image.

The solution to this problem appears simple: remove the offending RFI. Most prior art techniques for accomplishing this solution generally fall into one of two categories.

One category includes attempts to filter the RFI from the raw data prior to image formation.

For example, H. Hellsten, U.S. Pat. No. 6,072,420, Jun. 6, 2000, discloses a radar system with a control unit which partitions the transmit-receive process into a number of consecutive sub-processes each of which consists of transmission followed by reception of a signal having a relative bandwidth of a fraction of an octave. The received signals from the different narrow band transmissions are used to reconstruct broad band radar data by pulse compression techniques. R. Goodman et al., U.S. Pat. No. 5,850,202, Dec. 15, 1998, discloses a SAR where a sequence of data processing operations initially uses a high number of bits to digitize radar echoes plus RFI, and then compresses the RFI tones, followed by additional processing which nulls the primary RFI contributors and finally requantizes the radar signal to a lower number of bits over the appropriate range of signal levels.

A variation of the first category taught by J. Garnaat et al., U.S. Pat. No. 5,546,085, Aug. 13, 1996, exploits any pulse-to-pulse coherence of interfering sources. A quadratic phase removal process removes quadratic phase variations contained in the interference to compress the interference to its narrowest extent in a range frequency dimension. While this technique works reasonably well for interfering broadcast television stations in the UHF band, many other emitters do not correlate well and, therefore, do not compress under this technique.

The second category attempts to model the RFI and cancel it in the raw data. For example, J. K. Jao, U.S. Pat. No. 6,166,678, Dec. 26, 2000, discloses a system where I/Q equalization is performed, which permits the data bandwidth to be reduced, thereby reducing RFI in the system.

One characteristic of all these systems is that they require modifications to the SAR hardware, although one skilled in the art can in fact often adapt many of these systems to software-only operations. More seriously, while these systems modify the raw data to remove RFI, they also are removing radar echo information and thereby degrading the SAR image, primarily by increasing offensive sidelobes in the range dimension.

H. Stankwitz et al., *Nonlinear Apodization for Sidelobe Control in SAR Imagery*, IEEE Transactions on Aerospace and Electronic Systems, Vol. 31, No. 1, January 1995, pp. 267–279, discusses a technique they call 'dual apodization' where the complex image is processed at least twice using a different weighting functions each time. For each spatial location (or pixel), the minimum of the multiple values calculated from the multiple processes is utilized to form the image. If the proper weighting function is selected, the technique reduces sidelobes without reducing the mainlobe and is useful for sharpening a return from a bright target. Notably, this technique uses specific weighting functions for their particular sidelobe characteristics, presuming the entire spectrum exists. This technique does not filter RFI, nor does it accommodate effects of filtering arbitrary RFI, nor does it address utilizing RFI corrupted images to facilitate enhancing RFI-filtered images. A later paper by Stankwitz and Kosek, *Sparse Aperture Fill for SAR Using Super-SVA*, Proceedings of 1996 IEEE National Radar Conference, Ann Arbor, Mich., USA, May 13–16, 1996, proposes to fill in a spectrum gap (such as might be created by filtering RFI), but ignores entirely any notion of utilizing the original the RFI-corrupted data itself to facilitate sidelobe reduction.

Later work by H. Stankwitz et al. in U.S. Pat. No. 5,686,922, Nov. 11, 1997, utilizes dual apodization to improve the resolution of a SAR image. G. Thomas et al., *SAR sidelobe apodization using parametric windows*, SPIE, Vol. 3721, pp. 68–77, April 1999, discusses the effect of using different apodization filters.

SUMMARY OF THE INVENTION

It is an object of this invention to reduce interference without adversely affecting sidelobes using a characteristic of the interference rather than a preselected weighting function It is a further object of this invention to use RFI filtering in an apodization-like system to improve a SAR image with minimal loss of information To achieve the foregoing and other objects, and in accordance with the purpose of the present invention, as embodied and broadly described herein, this invention includes forming a first digital image from a phase-history data set that includes RFI and forming a second digital image after a frequency band containing the RFI has been removed from a phase history data set. The scaled images are then compared on a pixel by pixel basis; and a composite digital image is formed from the compared pixels having the lower magnitude.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 3 shows a block diagram of a first embodiment of the invention.

FIG. 4 hows a block diagram of a second embodiment of the invention.

DETAILED DESCRIPTION OF THE INVENTION

This invention is for removing electrical interference that exists at determinable frequencies from a radar signal that encompasses those determinable frequencies. It is disclosed for use with a SAR, however, those skilled in the art will recognize that it may be utilized in any electronic receiver that processes a digital imaging signal, such as some ultrasound and other radar systems.

Figure 1:
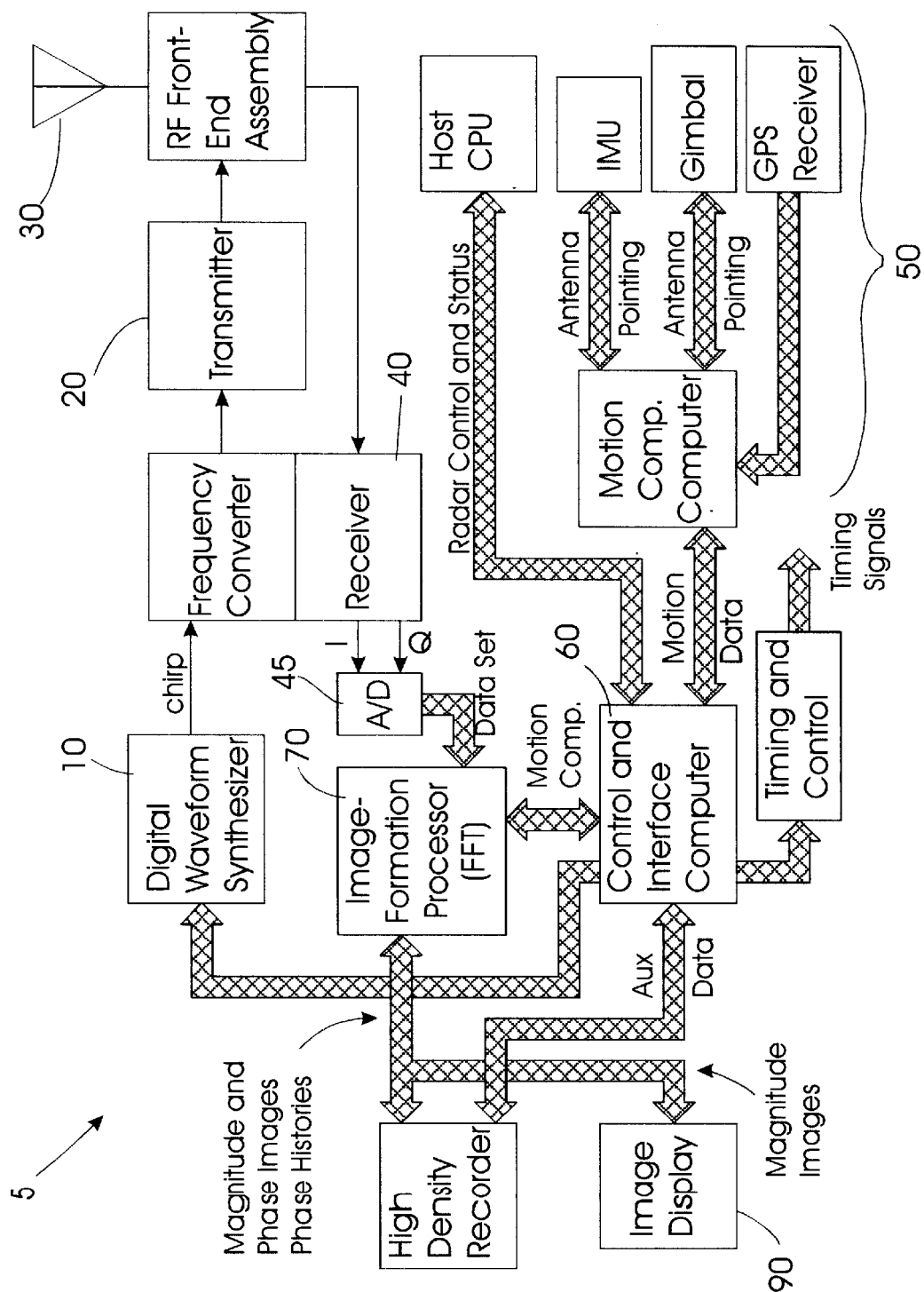
FIG. 1 shows a block diagram of a prior art SAR.

FIG. 1 shows a prior art SAR 5 as disclosed by B. Walker et al., *A High-Resolution, Four-Band SAR Testbed with Real-Time Image Formation*, Sandia Corporation, SAND96-0661C, May 1996, also Proceedings of IGARSS '96, 1996 International Geoscience and Remote Sensing Symposium, vol. 3, p. 1881–5, Lincoln, Nebr., USA, May 27–31, 1996, which report is incorporated herein by reference. This SAR is mounted on an airplane and includes a digital-waveform synthesizer 10 for generating a chirp waveform and a transmitter 20 for amplifying the waveform and supplying it to an antenna 30 that transmits the signal transverse to the path of the airplane. The radar return is received by antenna 30 and processed by receiver 40 to form a raw SAR data video signal having real (I) and imaginary (Q) components.

To form fine-resolution SAR images, the system must compensate for significant non-straight-line motion of the airplane. Some motion-compensation steps are carried out before the return signal is processed by changing the radar center frequency and phase, pulse-rate frequency, and the A/D converter sample rate. A motion-measurement system 50 provides inputs to a control computer 60 to make these adjustments.

The video signal is digitized in an A/D converter 45 to form a SAR data set consisting of phase history data, and then processed by an image-formation processor 70 which essentially performs a two dimensional fast Fourier transformation of the data set from the time domain to the frequency domain. (In the SAR of FIG. 1, the A/D converter 45 is part of processor 70; however, for the explanation of this invention, they are treated as separate elements.) Additional corrections and data interpolations are also often employed during image formation to facilitate easy and speedy operation on digital signal processing hardware and computers. The resulting complex SAR image from processor 70 may be displayed on display 90 as an image having less than one foot resolution for a Ku band SAR.

For a typical signal, azimuth and range sidelobes for the system of FIG. 1 are below −35 dBc. However, if RFI is present, the image will be corrupted and masked by the RFI signal.

Figure 2A:
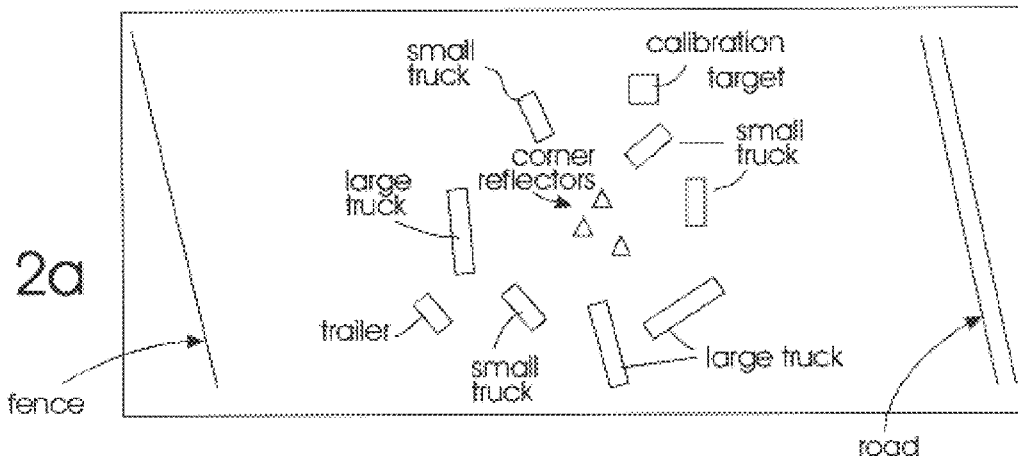
FIG. 2a shows a schematic view of the target scene of FIGS. 2b and 7.
Figure 2B:
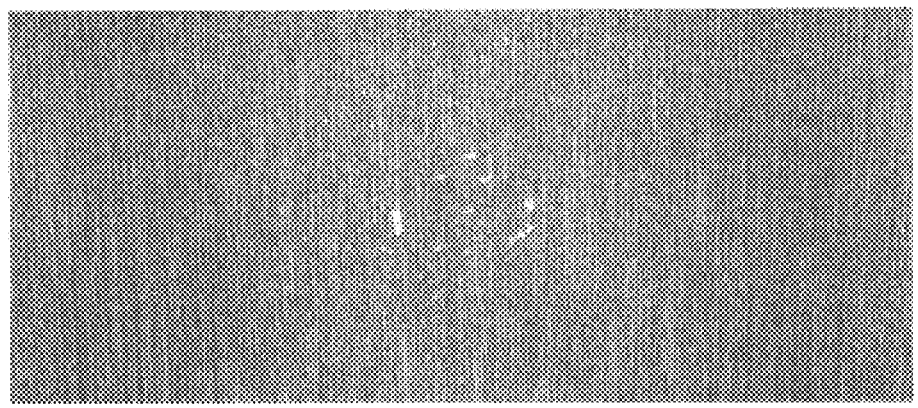
FIG. 2b shows a SAR image of the view of FIG. 2a with RFI.

FIG. 2a shows a sketch of a rough circle of vehicles parked around some corner reflectors between a fence and a road. FIG. 2b shows an L/S band SAR image of the scene of FIG. 2a. The SAR image displays a resolution of 23 cm (9 inches) at a center frequency of 2.16 GHz. To achieve this resolution, the radar emits and receives chirped signals in the approximate frequency band 1.75 GHz to 2.55 GHz. The image has been corrupted by interference from wireless digital service emitters transmitting in relatively narrow frequency bands approximately centered at both 1.95 GHz and 2.32 GHz. The effect of the RFI on the SAR image is to render it difficult to discern the targets. The fence is barely discernable; the road is not detected. The obvious solution is to remove the RFI to get a clearer image. Merely filtering the offending frequencies from the return signal is not an optimal solution, as valuable information may also be filtered. Such filtering has the effect of substantially increasing objectionable sidelobes in the resulting image.

A first embodiment of the invention is shown in FIG. 3. The SAR data set is a digitized time-domain signal that includes RFI received by antenna 30 in addition to the radar return signal. In accordance with this embodiment, this data set is processed twice and combined. Path A is the same processing shown in FIG. 1; the signal is processed to form an image (such as by block 70 of FIG. 1). In path B, the known frequency bands of the offending RFI are filtered from the signal, the image is formed, and the resulting image is scaled to account for the energy lost in the filtered bands. The two images are then combined by comparing corresponding pixels from each image and using the minimum magnitude pixel values from each comparison to form the final image. The pixel-by-pixel comparison is taught by Stankwitz et al.; the manner in which the two images are formed is new to this invention.

One of ordinary skill in the art can readily implement this embodiment with one of at least two hardware schemes. For a parallel scheme, two image-formation processors 70 are provided along hardware paths A, B that emulate the functions of FIG. 3. For path A, the digitized video output from A/D converter 45 is provided directly to a first processor in the manner illustrated in FIG. 1. For path B, the video output is provided to a second processor through a filter that removes only the frequency band or bands containing the RFI. The complex SAR image output from the second processor is scaled and compared on a pixel-by-pixel basis as discussed above.

To scale the image, pixel values are multiplied by a common constant by computer operations. The scale factor value is computed in a manner to provide the same energy value for a particular target in both images. This can be done, for example, by selecting the brightest point in one image and scaling the other image to match the corresponding brightest point's value.

For a series scheme, the image is stored in a buffer and processed by processor 70 of FIG. 1 on one pass. On another processing pass, RFI is filtered from the data set before it is applied to the processor 70. The complex SAR image from whichever pass was done first is stored, the output from the second pass is also stored; the filtered pass is scaled, and the comparison made on a pixel-by-pixel based as discussed above.

Of course, other obvious modifications, such as scaling the unfiltered image to match the filtered image, are also contemplated in the practice of the invention.

Figure 5:
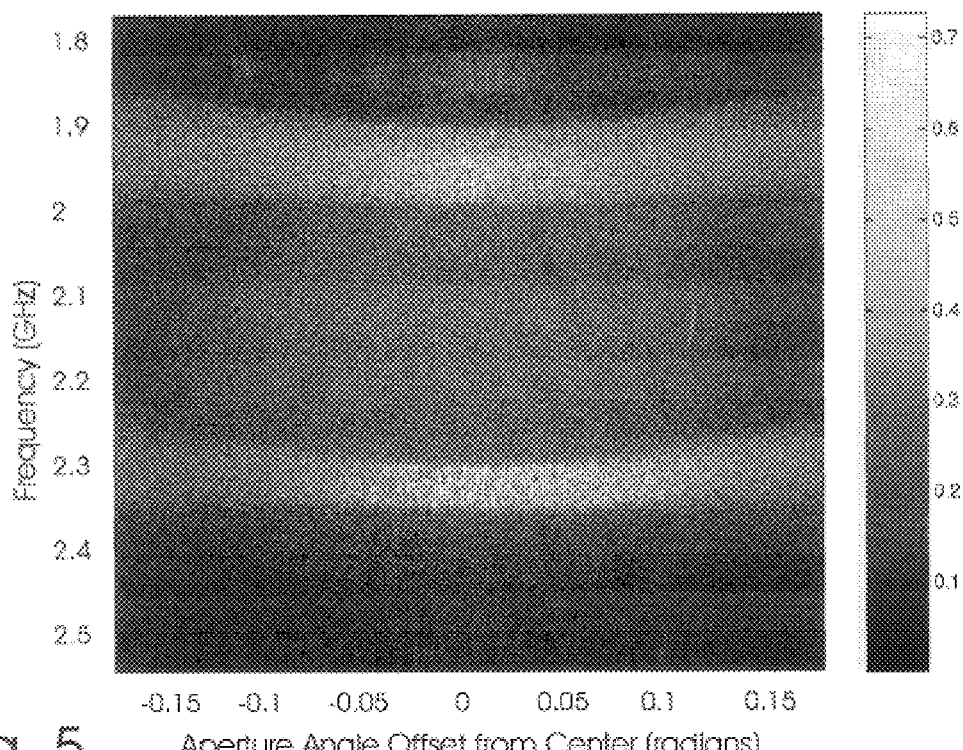
FIG. 5 shows the pseudo-phase history output of the system of FIG. 4

For the embodiment of FIG. 4, the digitized resultant complex SAR image output from processor 70 is utilized. As before, two paths are compared on a pixel-by-pixel basis, with path A being the image signal from processor 70. For path B, the image signal is inverse Fourier transformed at block 72 to provide a pseudo-phase-history data set of the image. FIG. 5 shows such a signal for the image of FIG. 2. In this figure, the X-axis corresponds to both the pulse number and also to the position in the synthetic aperture (the figure shows the instantaneous viewing angle with respect to the aperture center in units of radians). The Y-axis is time during the received signal from any one pulse but also corresponds to the frequency content of the received pulse (by virtue of using liner-FM chirp signals and deramping the echoes prior to digitization). The bright bands correspond to the RFI.

Figure 6:
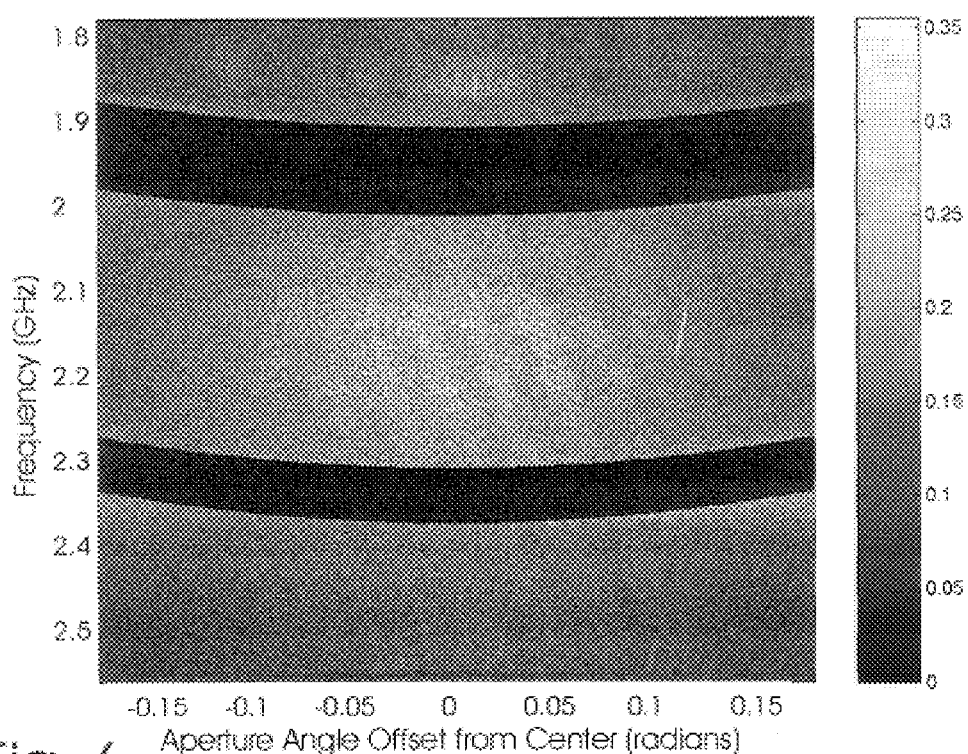
FIG. 6 shows the image of FIG. 5 with RFI removed.

FIG. 6 shows the same image with the RFI removed by block 74 of FIG. 4. After a Fourier transform in block 76 to put the signal back in to the form of a complex SAR image, the signal is scaled in block 78 and compared on a pixel-by-pixel basis in block 80, selecting the lowest magnitude pixel value from corresponding pixels in each image, as discussed above.

Figure 7:
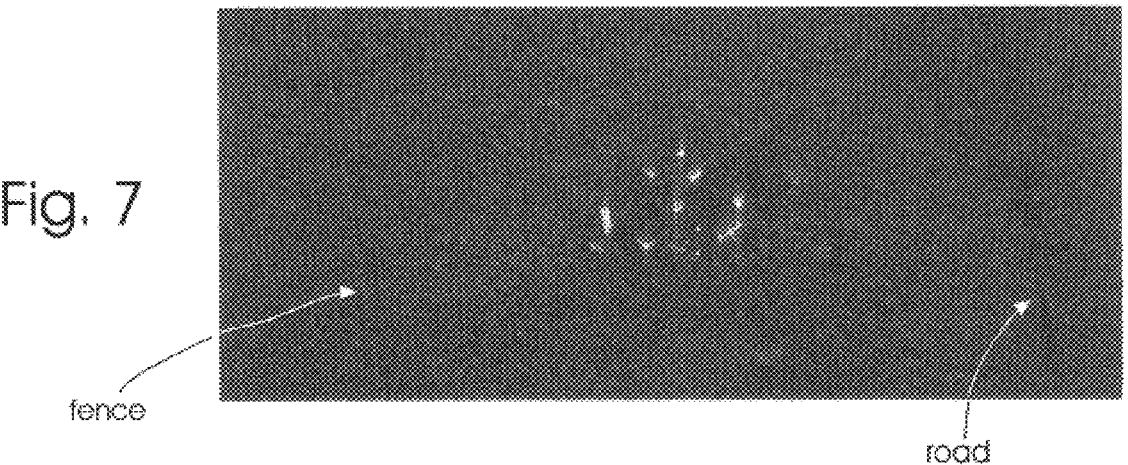
FIG. 7 shows the SAR image of FIG. 3 with RFI removed by the invention.

The resulting improved SAR image is shown in FIG. 7. A row of fence posts F is clearly seen on the left side of the image, as is a dark band corresponding to road R on the right side of the image. The targets in the center of the image are much clearer than in original image 2b.

Figure 8A:
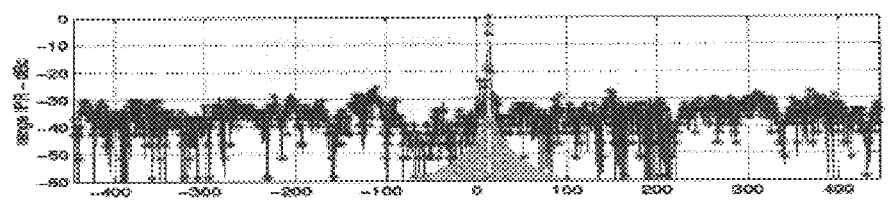
FIGS. 8a–8c show image magnitude of a slice of the SAR images of the invention.

FIG. 8a shows a plot of the image magnitude of a vertical slice through the center of the RFI-corrupted SAR image of FIG. 2b. The peak represents the response from one of the corner reflectors near the center of the image. In the upper plot, the left edge of the horizontal image corresponds to the bottom of the image; the right edge corresponds to the top of the image. The lower plot expands the horizontal scale to show the portion of the slice near the center of the image. These plots show that the sidelobes near the bright object are good, but that far-out sidelobes and the target scene are masked by interference.

Figure 8B:
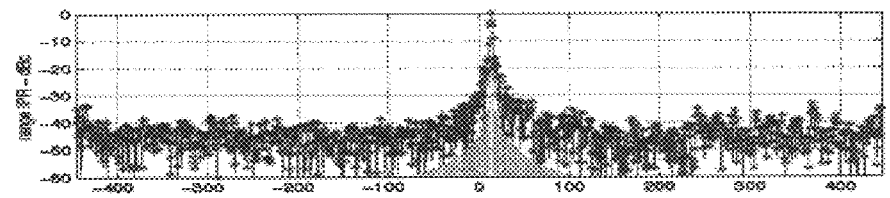

FIG. 8b shows the same views for the RFI filtered image at the output of block 78 of FIG. 4. The near-in sidelobes are bad (the peak has been spread), but the far-out interference has been reduced by about 10 dB to reveal scene content initially below the interference level.

Figure 8C:
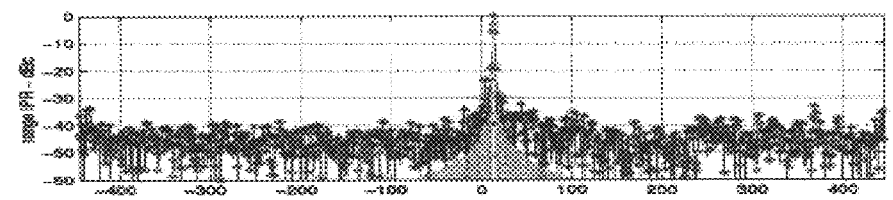

FIG. 8c shows the same views for the image of FIG. 7. The near-in sidelobes are good, and the far-out interference is reduced.

It should be apparent that there are many modifications possible with this invention, as long as the concept of comparing pixels between images formed with and without the offending interference is followed. It is intended that the scope of the invention be defined by the appended claims.

What is claimed is:

1. A method for removing radio frequency interference (RFI) from a digital synthetic aperture radar (SAR) imaging signal comprising:

forming a first digital image from a SAR phase-history data set that includes RFI;

forming a second digital image after a frequency band containing the RFI has been removed from a SAR phase history data set;

comparing the images on a pixel by pixel basis; and forming a composite SAR digital image from the compared pixels having the lower magnitude.

2. The method of claim 1 wherein each data set is a phase history resulting from digitizing received SAR signals.

3. The method of claim 2 wherein the step of forming the first digital image comprises taking a two-dimensional fast Fourier transform of the data set to form a complex SAR image.

4. The method of claim 3 wherein the step of forming the second digital image comprises the steps of:

removing frequency bands containing RFI from the data set; and taking a two-dimensional fast Fourier transform of the data set after RFI has been removed to form a second complex SAR image.

5. The method of claim 4 further comprising scaling one of said images to account for energy lost from the second image when frequency bands are removed.

6. The method of claim 5 wherein the scaling step comprises determining the location and magnitude of the brightest pixel in the first image, determining the magnitude of the equivalent pixel in the second image, and adjusting the magnitude of each pixel in the second image by a constant amount selected such that the magnitude of the equivalent pixel of the second image will be equal to the magnitude of the brightest pixel in the first image.

7. The method of claim 4 wherein the step of removing frequency bands comprises filtering out the frequency band containing RFI data.

8. The method of claim 3 wherein the step of forming the second digital image comprises the steps of:

performing an inverse Fourier transform on the first digital image to create a pseudo-phase history;

removing frequency bands containing RFI from the pseudo-phase history; and taking a two-dimensional fast Fourier transform of the pseudo-phase history after RFI has been removed to form a second complex SAR image.

9. The method of claim 8 further comprising scaling one of said images to account for energy lost from the second image when frequency bands are removed.

10. The method of claim 9 wherein the scaling step comprises determining the location and magnitude of the brightest pixel in the first image, determining the magnitude of the equivalent pixel in the second image, and adjusting the magnitude of each pixel in the second image by a constant amount selected such that the magnitude of the equivalent pixel of the second image will be equal to the magnitude of the brightest pixel in the first image.

11. The method of claim 8 wherein the step of removing frequency bands comprises filtering out the frequency band containing RFI data.

* * * * *